(12) United States Patent
Konishi et al.

(10) Patent No.: US 12,285,032 B2
(45) Date of Patent: Apr. 29, 2025

(54) FOOD/DRINK CONTAINING SUCROSE-CONTAINING PLANTS

(71) Applicant: MIZKAN HOLDINGS CO., LTD., Aichi (JP)

(72) Inventors: Manabu Konishi, Aichi (JP); Junichiro Ihara, Aichi (JP)

(73) Assignee: Mizkan Holdings Co., Ltd., Aichi (JP)

( * ) Notice: Subject to any disclaimer, the term of this patent is extended or adjusted under 35 U.S.C. 154(b) by 965 days.

(21) Appl. No.: 17/209,401

(22) Filed: Mar. 23, 2021

(65) Prior Publication Data
US 2021/0204573 A1 Jul. 8, 2021

Related U.S. Application Data

(63) Continuation of application No. PCT/JP2019/045278, filed on Nov. 19, 2019.

(30) Foreign Application Priority Data

Jun. 20, 2019 (JP) ................................ 2019-114710

(51) Int. Cl.
| | | |
|---|---|---|
| A23L 25/00 | (2016.01) | |
| A23L 2/39 | (2006.01) | |
| A23L 2/52 | (2006.01) | |
| A23L 5/30 | (2016.01) | |
| A23L 11/00 | (2025.01) | |
| A23L 19/00 | (2016.01) | |
| A23L 19/10 | (2016.01) | |
| A23L 19/15 | (2016.01) | |
| A23L 33/21 | (2016.01) | |

(52) U.S. Cl.
CPC ................ *A23L 25/30* (2016.08); *A23L 2/39* (2013.01); *A23L 2/52* (2013.01); *A23L 11/05* (2016.08); *A23L 19/00* (2016.08); *A23L 19/105* (2016.08); *A23L 19/15* (2016.08); *A23L 33/21* (2016.08); *A23L 5/32* (2016.08)

(58) Field of Classification Search
CPC . A23L 7/198; A23L 5/32; A23L 19/12; A23L 25/30; A23L 11/05; A23L 19/01; A23L 33/21; A23L 19/105; A23L 2/39; A23L 19/15
See application file for complete search history.

(56) References Cited

U.S. PATENT DOCUMENTS

| | | |
|---|---|---|
| 7,829,128 B2 | 11/2010 | Karwowski et al. |
| 2019/0373942 A1 | 12/2019 | Higuchi et al. |

FOREIGN PATENT DOCUMENTS

| | | | |
|---|---|---|---|
| JP | H10000076 A | 1/1998 | |
| JP | H10042821 A | 2/1998 | |
| WO | WO-2008093231 A2 * | 8/2008 | ............. A23B 7/028 |
| WO | 2019069490 A1 | 4/2019 | |

OTHER PUBLICATIONS

Machine translation WO2019/069490 (Year: 2019).*
EP0419359 machine translation (Year: 1991).*
WO-2019069490-A1 (Clarivate machine translation) (Year: 2019).*
Dunst, P, et al., "Vibration-Assisted Handling of Dry Fine Powders", Actuators vol. 7, No. 2. pp. 18, 2018. XP055844025, doi.org/10.3390/act7020018 (11 pages).
European Search Report issued in corresponding European application No. 19933312.1, dated Oct. 13, 2021 (5 pages).
About chemical substances in food, published on May 12, 2015 (4 pages).
T. W. Pearson et al; "Natural Occurring Levels of Dimethyl Sulfoxide in Selected Fruits, Vegetables, Grains, and Beverages"; J. Agric. Food Chem., 1981, vol. 29, pp. 1089-1091 (3 pages).
Z. Xiao et al.; "Generation of Acetoin and Its Derivatives in Foods"; J. Agric. Food Chem., 2014, vol. 62, pp. 6487-6497 (11 pages).
J. A. Pino et al.; "Volatile Components from Mango (*Mangifera indica* L.) Cultivars"; J. Agric. Food. Chem., 2005, vol. 53, pp. 2213-2223 (11 pages).
"Whole vegetables"ZENB" brand MIZKAN from March", published on Feb. 28, 2019 (3 pages).
International Search Report issued in corresponding International Application No. PCT/JP2019/045278; mailed Feb. 18, 2020 (3 pages).
Written Opinion of the International Searching Authority issued in corresponding International Application No. PCT/JP2019/045278; dated Feb. 18, 2020 (4 pages).

* cited by examiner

*Primary Examiner* — Elizabeth Gwartney
*Assistant Examiner* — Andrew E Merriam
(74) *Attorney, Agent, or Firm* — Osha Bergman Watanabe & Burton LLP

(57) ABSTRACT

A powdery food containing a sucrose-containing plant with a sucrose content of 2.5 mass % or more in terms of dry mass, a dietary fiber content of 1 mass % or more in terms of dry mass, has a particle sizes d50 after ultrasonication of 1,000 μm or less and has an acetoin content of 1 ppb or more and 40,000 ppb or less, is provided. The powdery food easily controls the burnt odor derived from sucrose and extract the sweet flavor peculiar to sucrose in a food and drink containing a powder derived from a sucrose-containing plant.

5 Claims, No Drawings

FOOD/DRINK CONTAINING SUCROSE-CONTAINING PLANTS

TECHNICAL FIELD

One or more embodiments of the present invention relate to a food/drink containing a sucrose-containing plant and a method for manufacturing the same, and a method for enhancing the sweet flavor of a food/drink containing a sucrose-containing plant.

BACKGROUND

A powdery food derived from a sucrose-containing plant is a micronized product of a sucrose-containing plant, and is generally produced by subjecting a sucrose-containing plant to a grinding process such as crushing or grating. At this time, the oxidation reaction of sucrose in vegetables by heat at the time of ground or the like impairs the sweet flavor derived from sucrose, and the taste of the sweet flavor becomes strongly perceived as a burnt odor, and the flavor of the sweet flavor is inferior to that of the raw state.

Patent Literature 1 discloses a technique for eliminating the quality deterioration, such as the burnt odor, due to heating in a process for manufacturing vegetable juice including a shredding process for shredding and/or grinding vegetables and a juice pumping process for squeezing shredded vegetables, in which the vegetables are heated at 65 to 95° C. after shredding or at the same time as shredding for five minutes from reaching the temperature. In addition, Patent Literature 2 discloses a technique for obtaining a dried vegetable (vegetable, fruit, seed) product which is not hard though a dried product, and is free of scorch and unpleasant color in appearance.

PATENT LITERATURES

[Patent Literature 1] JP Hei 10-000076-A
[Patent Literature 2] JP Hei 10-042821-A However, Patent Literature 1 provides a method for manufacturing a vegetable juice having high additional value by leaving a large amount of vitamin C in the vegetable juice, and there has been difficulty in drying and powdering. In addition, the method of Patent Literature 2 requires processing including a combination of pressurization and decompression though a dry condition, and the processing requires oil, and the obtained dried product was not fully suitable for general use because of the flavor and attribute derived from the oil.

SUMMARY

One or more embodiments of the present invention aim to provide a means for easily controlling the burnt odor derived from sucrose and extracting the sweet flavor peculiar to sucrose in a food and drink containing a powder derived from a sucrose-containing plant.

In view of the above circumstances, the present inventors found that the above problems could be easily solved simultaneously by containing a specific amount of a specific compound and also setting the particle diameter of a powdery food containing a sucrose-containing plant to a specific value or less, thereby completing one or more embodiments of the present invention.

That is, one or more embodiments of the present invention provide the following inventions [1] to [11].

[1] A powdery food comprising a sucrose-containing plant and satisfying following characteristics (1) to (4):
  (1) the powdery food has a sucrose content of 2.5 mass % or more in terms of dry mass;
  (2) the powdery food has a dietary fiber content of 1 mass % or more in terms of dry mass;
  (3) the powdery food has a particle sizes d50 after ultrasonication of 1,000 μm or less; and
  (4) the powdery food has an acetoin content of 1 ppb or more and 40,000 ppb or less.
[2] The powdery food according to [1], wherein the powdery food further has a dimethyl sulfoxide content of 1 ppb or more and 40,000 ppb or less.
[3] The powdery food according to [1] or [2], wherein the powdery food has a sucrose-containing plant content of 10 mass % or more with respect to the whole of the powdery food.
[4] The powdery food according to [1] to [3], wherein the powdery food has a content of sucrose derived from the sucrose-containing plant of 50 mass % or more with respect to the sucrose content of the whole of the powdery food.
[5] The powdery food according to any one of [1] to [4], wherein the sucrose-containing plant is one or more selected from the group consisting of grains, potatoes, pulses, nuts, vegetables, fruits, and mushrooms.
[6] The powdery food according to any one of [1] to [5], wherein the sucrose-containing plant is one or more selected from the group consisting of corn, pumpkin, beet, carrot, soybean, sweet potato, pineapple, banana, mango, and almond.
[7] A food/drink comprising the powdery food according to any one of [1] to [6].
[8] A method for manufacturing the powdery food according to any one of [1] to [6], the method comprising a step of crushing a sucrose-containing plant having a moisture content of 20 mass % or less.
[9] A method for manufacturing a powdery food containing a sucrose-containing plant and having a particle size d50 of after ultrasonication of 1,000 μm or less or a food/drink containing the powdery food, the method comprising crushing a sucrose-containing plant having a sucrose content of 2.5 mass % or more in terms of dry mass and a dietary fiber content of 1 mass % or more in terms of dry mass and allowing the powdery food to contain 1 ppb or more and 40,000 ppb or less of acetoin.
[10] A method for enhancing sweet flavor of a powdery food containing a sucrose-containing plant and having a particle size d50 after ultrasonication of 1,000 μm or less or a food/drink containing the powdery food, the method comprising crushing a sucrose-containing plant having a sucrose content of 2.5 mass % or more in terms of dry mass and a dietary fiber content of 1 mass % or more in terms of dry mass and allowing the powdery food to contain 1 ppb or more and 40,000 ppb or less of acetoin.
[11] The method according to [9] or [10], further comprising allowing the powdery food to have a dimethyl sulfoxide content of 1 ppb or more and 40,000 ppb or less.

DETAILED DESCRIPTION OF THE EMBODIMENTS

One or more embodiments of the present invention facilitate to easily control the burnt odor derived from sucrose and provides a method for bringing out sweet flavor characteristic to sucrose, in the powder food containing sucrose-containing plant.

Hereinafter, examples of the embodiments of the present invention will be described, but the embodiments are not limited to these aspects, and can be implemented with any modifications without departing from the gist thereof.

The sucrose-containing plant in one or more embodiments of the present invention refers to a plant that contains sucrose and is eaten or drunk by human, and may be an edible plant having a sucrose content of 2.5 mass % or more in terms of dry mass in a dry state. The sucrose-containing plant may contain both the edible part and the inedible part.

The plant in one or more embodiments of the present invention may be any plant that is eaten or drunk by human and is not limited in any way, and examples thereof include grains, potatoes, pulses, nuts, vegetables, fruits, mushrooms, and algae. Among these plants, grains, potatoes, pulses, nuts, vegetables, fruits, and mushrooms, which inherently contain sweet components, are more preferable. Furthermore, corn, pumpkin, beet, carrot, soybean, sweet potato, pineapple, banana, mango, and almond are preferred. Specifically, it is possible to understand which food corresponds to the edible plant in one or more embodiments of the present invention by, for example, referring to grains, potatoes, pulses, nuts, vegetables, fruits, mushrooms, and algae in the classification described in "the Standard Tables of Food Composition in Japan, 2015, (Seventh Revised Version) Supplement, 2018" (see the Food composition tables provided by the Ministry of Health, Labor and Welfare, in particular, Table 1 on page 236). These edible plants may be used alone or in an arbitrary combination of two or more thereof. These edible plants may be directly used or may be used after various treatments (e.g., drying, heating, harshness removal, peeling, seed removal, ripening, salting, and pericarp processing). The classification of an edible plant can be determined based on the state of the whole plant including the inedible part. The site and the proportion of the inedible part can be naturally understood by those skilled in the art who handle the food or processed food products. For example, the "disposal part" and the "wastage rate" described in "the Standard Tables of Food Composition in Japan, 2015, (Seventh Revised Version)" can be referred to and considered as the site and the proportion of the inedible part, respectively. The site and the proportion of the edible part can also be understood from the site and the proportion of the inedible part in an edible plant. The edible part and/or the inedible part thereof may be used in an arbitrary combination.

A powdery food derived from the sucrose-containing plant of one or more embodiments of the present invention may be prepared by subjecting the above-mentioned various edible plants to drying and crushing, and using the resultant as all or a part of the powdery food. As the drying method, an arbitrary method that is generally used in drying of foods can be used. Examples thereof include sun drying, shade drying, air drying (e.g., hot air drying, fluidized bed drying method, spray drying, drum drying, and low temperature drying), pressure drying, vacuum drying, microwave drying, and oil heat drying. In particular, a method involving air drying (e.g., hot air drying, fluidized bed drying method, spray drying, drum drying, or low temperature drying) is preferable in view of a small degree of change in color tone or flavor inherent in the plant and relative ease of suppressing the non-food aroma (e.g., burnt odor).

The "dry" state in the present disclosure refers to a state where the moisture content may be 20 mass or less, or a state where the moisture content may be 10 mass % or less. It is more preferable that the water activity value be 0.95 or less, further 0.90 or less, further 0.85 or less, further 0.80 or less, and further 0.75 or less.

In other words, one or more embodiments of the present invention encompass a method for manufacturing the powdery food of one or more embodiments of the present invention, where the method includes crushing a plant having a moisture content of 20 mass % or less. One or more embodiments of the present invention further include the method wherein the moisture content of the plant is 10 mass % or less, and further includes the method wherein the water activity value of the plant is 0.95 or less, further 0.90 or less, further 0.85 or less, further 0.80 or less, and further 0.75 or less.

In the present disclosure, the term "in terms of dry mass" refers to an equivalent value to the mass when the water content is 0 mass %.

In quantitative measurement of moisture, a moisture content based on the wet mass is measured by a method involving subjecting a powder derived from a sucrose-containing plant or a powdery food containing it to heat drying under reduced pressure. Specifically, an appropriate amount of a sample is placed in a scale container previously adjusted to a constant weight (W0) and is measured (W1) up to the digit of 0.1 mg. Under ordinary pressure, the scale container with the lid removed or the aperture open is put in an electric dryer that enables a constant temperature and reduced pressure, the electric dryer being adjusted to a predetermined temperature (more specifically, 90° C.). The door is closed, the vacuum pump is operated, and drying is performed at a predetermined degree of reduced pressure for a predetermined period of time. The vacuum pump is stopped, the pressure is returned to ordinary pressure by sending dry air, the scale container is taken out, the lid is put on the container, and after allowing to cool in a desiccator, the mass is weighed. The drying, cooling, and weighing the mass are repeated until a constant weight (W2, measuring up to the digit of 0.1 mg) is reached. The moisture content (mass %) is determined by the following calculation equation.

$$\text{Moisture}(g/100g)=(W1-W2)/(W1-W0)\times 100$$

W0: mass (g) of the scale container adjusted to constant weight,
W1: mass (g) of the scale container containing a sample before drying, and
W2: mass (g) of the scale container containing the sample after drying.

The water activity value is a numerical value representing the proportion of free water in a food and is used as an indicator of the preservability of a food. Specifically, it is the value obtained by dividing the equilibrium vapor pressure (p) in the headspace on a sample by the vapor pressure (p0) of water at the same temperature, and in other words, is the value obtained by dividing the equilibrium relative humidity (ERH) in the headspace by 100. The water activity value can be measured with a general water activity measuring device (e.g., "LabMaster-aw NEO" manufactured by Novasina AG, employing an electric resistance based (electrolyte based) humidity sensor).

For the powdery food containing a sucrose-containing plant of one or more embodiments of the present invention, the method of crushing used for pulverization is not particularly limited. The temperature at the time of crushing is also not limited, and any of high-temperature crushing, ordinary-temperature crushing, and low-temperature crushing may be performed. The pressure at the time of crushing is also not limited, and any of high-pressure crushing, ordinary-pressure crushing, and low-pressure crushing may be performed. Examples of the apparatus for such crushing include apparatuses, such as a blender, a mixer, a mill, a kneader, a grinder, a crusher, and an attritor, and any of these apparatuses may be used. As such an apparatus, for example, a medium stirring mill, such as a dry bead mill and a ball mill (a rolling type, a vibration type, etc.), a jet mill, a high-speed rotary impact type mill (e.g., pin mill), a roll mill, or a hammer mill can be used.

The powdery food containing a sucrose-containing plant of one or more embodiments of the present invention (hereinafter, may be simply referred to as the powdery food of one or more embodiments of the present invention) contains a certain amount or more of sucrose. Specifically, the sucrose content in the powdery food of one or more embodiments of the present invention may be 2.5 mass % or more in terms of dry mass and may be 3 mass % or more, 3.5 mass % or more, 4 mass % or more, or 5 mass or more. The sucrose content derived from the sucrose-containing plant may be 50 mass % or more, 70 mass or more, 90 mass % or more, or 100 mass %, in terms of dry mass, with respect to the sucrose content of the whole of the powdery food of one or more embodiments of the present invention. Furthermore, the sucrose content derived from the fine particles (having a d50 after ultrasonication of 1,000 μm or less; difference in states, such as dry and wet states, does not matter) derived from the sucrose-containing plant may be 50 mass % or more, 70 mass % or more, 90 mass % or more, or 100 mass %, in terms of dry mass, with respect to the sucrose content of the whole of the powdery food of one or more embodiments of the present invention. On the other hand, although the upper limit of the sucrose content is not particularly limited, the content of sucrose in the powdery food of one or more embodiments of the present invention may be 70 mass % or less or 60 mass % or less in terms of dry mass. In one or more embodiments of the present invention, the sucrose content in a powdery food or a sucrose-containing plant is measured by high-performance liquid chromatography in accordance with "the Standard Tables of Food Composition in Japan, 2015, (Seventh Revised Version)".

The powdery food of one or more embodiments of the present invention contains more than a certain amount of dietary fibers. Specifically, the dietary fiber content in the powdery food of one or more embodiments of the present invention may be 1 mass % or more in terms of dry mass and may be 2 mass % or more, 3 mass % or more, 4 mass or more, 5 mass % or more, 6 mass % or more, 7 mass or more, 8 mass % or more, 9 mass % or more, 10 mass % or more, 12 mass % or more, or 14 mass % or more. The upper limit of the dietary fiber content may be 90 mass % or less, 80 mass % or less, 70 mass % or less, 60 mass % or less, or 50 mass % or less.

Furthermore, a powdery food in which the proportion of insoluble dietary fibers in the dietary fibers is a predetermined value or more is preferable because the burnt odor derived from sucrose can be easily suppressed to effectively utilize one or more embodiments of the present invention. Specifically, the proportion of the insoluble dietary fibers in the dietary fibers may be 50 mass % or more, 60 mass % or more, or 70 mass % or more. As the method for quantitatively measuring dietary fibers and insoluble dietary fibers, a general modified Prosky method is used in accordance with "the Standard Tables of Food Composition in Japan, 2015, (Seventh Revised Version)".

In one or more embodiments of the present invention, the content of the sucrose-containing plant with respect to the whole of the powdery food may be within a predetermined range. For example, the content of the sucrose-containing plant with respect to the whole of the powdery food may be 10 mass % or more in terms of dry mass and may be, in view of suppressing burnt odor and extracting sweet flavor, 30 mass % or more, 50 mass % or more, 70 mass % or more, 90 mass % or more, or 100 mass %. The fine particles (having a d50 after ultrasonication of 1,000 μm or less; difference in states, such as dry and wet states, does not matter) derived from the sucrose-containing plant with respect to the whole of the powdery food may be 10 mass % or more, 30 mass % or more, 50 mass or more, 70 mass % or more, 90 mass % or more, or 100 mass in terms of dry mass. In a powdery food in which the content of the sucrose-containing plant with respect to the whole of the powdery food is not 100 mass %, the type of other powder is not limited in any way as long as the effects of one or more embodiments of the present invention are not impaired. Any powdered food material can be appropriately selected according to the desired flavor and quality for the final powdery food without any limitation on the type, the combination thereof, and the use. As such a powdered food material, for example, sodium chloride, sucrose, and dextrin can be mentioned.

The powdery food of one or more embodiments of the present invention contains more than a certain amount of acetoin (CAS. No. 513-86-0, another name: 3-hydroxy-2-butanone) in view of suppressing the burnt odor derived from sucrose and enhancing the sweet flavor derived from sucrose. As specific contents, the lower limit may be 1 ppb or more and may be, in view of more notably providing the effects of one or more embodiments of the present invention, 3 ppb or more, 5 ppb or more, or 10 ppb or more. The upper limit may be 40,000 ppb or less and may be, in view of the risk of occurrence of off-flavor, 30,000 ppb or less, 20,000 ppb or less, 10,000 ppb or less, 5,000 ppb or less, or 2,000 ppb or less.

The powdery food of one or more embodiments of the present invention may contain more than a certain amount of dimethyl sulfoxide (CAS. No. 67-68-5, another name: DMSO) in view of suppressing the burnt odor derived from sucrose and enhancing the sweet flavor derived from sucrose. Specifically, the lower limit may be 1 ppb or more and may be, in view of providing the effects of one or more embodiments of the present invention, 3 ppb or more, 5 ppb or more, or 10 ppb or more. The upper limit may be 40,000 ppb or less and may be, in view of the risk of occurrence of off-flavor, 30,000 ppb or less, 20,000 ppb or less, 10,000 ppb or less, 5,000 ppb or less, or 2,000 ppb or less. It is further preferable to contain both acetoin and dimethyl sulfoxide because the effect of suppressing the burnt odor derived from sucrose and the effect of enhancing the sweet flavor derived from sucrose are synergistically promoted, and it is desirable that both components be contained in the respective predetermined contents.

Acetoin is a compound having a yogurt or butter-like aroma and is known to be contained mainly in a fermented food as a flavor component. However, the effects of acetoin of suppressing the burnt odor derived from sucrose in a powdery food containing a sucrose-containing plant and enhancing the sweet flavor derived from sucrose have not been known at all. Furthermore, it has been thought that dimethyl sulfoxide, which is tasteless and odorless in itself, does not influence other flavor, and it has not been known at all that when both dimethyl sulfoxide and acetoin are contained in regulated amounts, further enhancing effects are exhibited on the effects of suppressing the burnt odor derived from sucrose in a powdery food containing a sucrose-containing plant and enhancing the sweet flavor derived from sucrose.

In one or more embodiments of the present invention, the content of acetoin is measured according to a usual method by the following GC/MS assay. The content of dimethyl sulfoxide can be measured according to a usual method by, for example, a combination of the following GC/MS assay and a pulsed flame photometric detector.

As the method for extracting acetoin or others from a sample, dilution with distilled water is performed because acetoin has high affinity for water. As the measurement method, a full evaporation-dynamic headspace-gas chromatography-mass spectrometry (hereinafter, "FE-DHS-GC/MS") method is performed, which measures water-soluble components that cannot be measured by ordinary analysis by forcibly volatilizing a very small amount of a sample thoroughly by a DHS method (a dynamic extraction method by forcibly purging the volatile components in the gas phase with an inert gas and collecting the volatile components with an adsorbent). Dimethyl sulfoxide is also analyzed by the same procedure. For example, a sample is well homogenized in an appropriate amount (20-fold amount) of distilled water to extract components, the solid content is removed by, for example, filtration, a significantly small amount (0.03 g) of the residue is weighed in a 10-mL flat bottom vial, the vial is then sealed, the whole quantity of the sample is forcibly volatilized by purging with an excess amount of nitrogen gas and is adsorbed with an adsorption resin (Tenax column) according to the properties of the analytical components, the resulting resin is then treated with a heating and desorbing system to introduce to a two-dimensional gas chromatographic analyzer, and analysis is performed. In order to measure the concentration of a component in a sample, the sample and a standard sample diluted to an arbitrary concentration are analyzed to grasp the confirmation ion peak areas of both samples, and the values are compared to each other to measure the concentration of the component in the sample.

After the analysis above, a part of the sample is applied to a mass spectrometer to obtain the mass spectrum, and the retention times of both components are verified based on the related ions of each component (acetoin: 43, 45, 88, dimethyl sulfoxide: 45, 63, 78).

The mass spectrometer (MS) used is a quadrupole type 5973 Mass Selective Detector (manufactured by Agilent Technologies, Inc.). Mass spectral analysis can be performed by carrying out an ionization method EI+ at an ionization potential of 70 eV, importing the result by a scan mode, and carrying out identification using ions characteristic to each component (acetoin: 43, 45, 88) as related ions, and the retention time of acetoin can be specified by specifying the retention time in which all these related ions in the standard product are detected.

Specifically, FE-DHS-GC/MS analysis is performed under the conditions as below.

[GC/MS Condition (Full Evaporation Dynamic Headspace (FE-DHS) Injection Method)]
Apparatus: 7890B (GC) and 5977B (MS) manufactured by Agilent Technologies, Inc., and MultiPurpose Sampler (auto-sampler) manufactured by Gerstel GmbH & Co., KG
Adsorption resin: TENAX
Incubation temperature: 80° C.
Nitrogen gas purge volume: 3 L
Nitrogen gas purge flow rate: 100 mL/min
TDU: [30° C.]-[210° C./min]-[240° C. (3 min)]
CIS: [10° C.]-[120° C./see]-[240° C.] (liner filler: TENAX)
Column: DB-WAX (30 m×250 μm×0.25 μm) manufactured by Gerstel GmbH & Co., KG
Column temperature: [40° C. (3 min)]-[5° C./min]-[240° C. (7 min)]
Carrier gas: He
Transfer line: 250° C.
Ion source temperature: 230° C.
Scan Parameter: m/z=from 28.7 to 300
Split: none A significantly low concentration of a sulfur-containing compound (dimethyl sulfoxide) in a sample can be detected by applying a part of the sample to a pulsed flame photometric detector and analyzing the sulfur compound in the sample. The pulsed flame photometric detector may be any general pulsed flame photometric detector. Specifically, OI Analytical 5380 Pulsed Flame Photometric Detector (manufactured by OI Analytical) can be used. Analysis of a sample can be performed by S mode (condition optimized for sulfur).

Under the conditions above, an authentic preparation of dimethyl sulfoxide (manufactured by FUJIFILM Wako Pure Chemical Corporation) having a known concentration is diluted with distilled water to an appropriate concentration and is added to a sample, and the resultant is subjected to analysis. The pulsed flame photometric detector can selectively detect only a sulfur compound by burning a material in a reducing hydrogen flame and detecting light having a specific wavelength of 394 nm occurring at that time, and a significantly small amount of a sulfur component can also be detected. The detector can be used for detecting a significantly small amount of a sulfur compound by utilizing its high selectivity. Acetoin, which has an odor, and dimethyl sulfoxide, which has almost no odor, can be distinguished from each other by performing olfactometry together with the detection. High-sensitive sulfur component detection ability by the pulsed flame photometric detector, qualitative analysis based on a mass spectral pattern by a mass spectrometer, and discrimination based on odor characteristics by olfactometry are combined, and a peak in or near a retention time of 21 to 24 minutes is determined to be from dimethyl sulfoxide. The components in a sample can be quantitatively measured by comparing the amounts of confirmation ions (dimethyl sulfoxide: 78) in the authentic preparation-free area and the authentic preparation-added area, and the confirmation ions (dimethyl sulfoxide: 78) of each component extracted in 5 mass % aqueous solution and volatilized can be measured by FE-DHS-GC/MS analysis implemented under the above-described suitable conditions.

Under the conditions above, authentic preparations of acetoin and dimethyl sulfoxide (manufactured by Tokyo Chemical Industry Co., Ltd. and FUJIFILM Wako Pure Chemical Corporation, respectively) having known concentrations are diluted with distilled water to appropriate concentrations, and the distilled product and a sample are subjected to analysis. The component in the sample can be quantitatively measured by comparison with the retention time of the standard product through analysis based on a mass spectral pattern by a mass spectrometer, although there is some deviation depending on the measurement conditions, and by comparison of the amounts of confirmation ions (acetoin: 45, dimethyl sulfoxide: 78) between the diluted authentic preparations and the sample in or around the retention time of the peak that seems to be the target component (for example, around a retention time of 13 to 16 minutes for acetoin, and around a retention time of 21 to 24 minutes for dimethyl sulfoxide).

It is particularly preferable to half-cut the area near the retention time of a peak that seems to be the target component and implement two-dimensional gas chromatography with columns of different properties, because the component concentration can be more exactly quantitatively measured.

Specifically, the two-dimensional gas chromatography can be performed under the following conditions.

[Two-Dimensional GC/MS Conditions]
CTS: [−150° C.]-[20° C./see]-[250° C.]
Column: DB-5 (10 m×180 μm×0.4 μm) manufactured by Gerstel GmbH & Co., KG
Column temperature: [40° C. (0 min)]-[40° C./min]-[240° C. (15 min)]
Carrier gas: He For acetoin in one or more embodiments of the present invention, the pure form thereof or a composition containing it may be allowed to be contained in a powdery food, and when the powdery food of one or more embodiments of the present invention is served for eating or drinking, acetoin may be derived from the food or drink and may be derived from a plant. The same is applied to dimethyl sulfoxide.

In one or more embodiments of the present invention, the particle size d50 of a powdery food after ultrasonication is a predetermined value or less in view of suppressing the burnt odor derived from sucrose and enhancing the sweet flavor derived from sucrose. Specifically, the upper limit of the particle size d50 is 1,000 μm or less and may be, in particular, 900 μm or less, 800 μm or less, 700 μm or less, 600 μm or less, 500 μm or less, 400 μm or less, 300 μm or less, 200 μm or less, or 100 μm or less. The lower limit is usually 0.3 μm or more for industrial convenience and may be 1 μm or more, or 3 μm or more. In the present disclosure, the "ultrasonication" is treatment of applying ultrasonic waves having a frequency of 40 kHz to a measurement sample at an output of 40 W for 3 minutes, unless otherwise specified.

The particle size d50 of a powdery food is defined as the particle size at which the ratio between the proportion of the cumulative value of particle frequency in % on the large side and the proportion of the cumulative value of particle frequency in % on the small side is 50:50 when the particle size distribution of the powdery food is divided into two from a certain particle size. The particle size d50 of a powdery food can be measured using, for example, a laser diffraction particle size distribution analyzer described below. The term "particle size" herein refers to that measured on a volume basis unless otherwise specified.

The conditions for measuring the particle size d50 of the powdery food of one or more embodiments of the present invention are as follows. First, the solvent used at the time of measurement is ethanol, which hardly affects the structure of the powdery food. The laser diffraction particle size distribution analyzer used for the measurement is a laser diffraction particle size distribution analyzer having a measurement range of at least from 0.02 to 2,000 μm by a laser diffraction scattering method. For example, Microtrac MT3300 EXII system of MicrotracBEL Corporation is used, and as the measurement application software, for example, DMS2 (Data Management System version 2, MicrotracBEL Corporation) can be used. When the measurement apparatus and the software above are used, measurement may be performed by pressing down the washing button of the software to implement washing, pressing down the set zero button of the software to implement zero adjustment, and directly charging a sample by sample loading until the concentration of the sample falls within an appropriate range. When a sample after disturbance, i.e., a sample after ultrasonication is subjected to the measurement, a previously ultrasonicated sample may be put, or a sample may be put and then ultrasonicated using the above-mentioned measurement apparatus, followed by the measurement. In the latter case, a sample not subjected to ultrasonication is put, the concentration is adjusted within an appropriate range by sample loading, and the ultrasonication button of the software is then pressed down to perform ultrasonication. Subsequently, defoaming is performed three times, and then sample loading is performed again. Immediately after verification that the concentration is still within the appropriate range, laser diffraction is performed at a flow rate of 60% for a measurement time of 10 seconds, and the result can be used as the measured value. The parameters at the time of measurement are, for example, distribution display: volume, particle refractive index: 1.60, solvent refractive index: 1.36, upper limit of measurement (μm)=2,000.00 μm, and lower limit of measurement (μm)=0.021 μm.

In the determination of the particle size d50 after ultrasonication of the powdery food of one or more embodiments of the present invention, it is preferable to measure the particle size distribution at each channel (CH) and then determine the d50 using the particle size for each measurement channel shown in Table 1 below as the standard. Specifically, the particle frequency in % of each channel (which is also referred to as "particle frequency in % for XX channel") can be determined by measuring the frequency of particles that are not larger than the particle size specified for each of the channels shown in Table 1 below and larger than the particle size (in the channel largest in the measurement range, measurement lower limit of particle size) specified for the channel of a larger number by one for each channel shown in Table 1 and using the total frequency of all channels within the measurement range as the denominator. For example, the particle frequency in % of channel 1 represents the frequency in % of particles having sizes of 2,000.00 μm or less and higher than 1, 826.00 μm.

TABLE 1

| Channel | Particle size (μm) |
|---|---|
| 1 | 2000.000 |
| 2 | 1826.000 |
| 3 | 1674.000 |
| 4 | 1535.000 |
| 5 | 1408.000 |
| 6 | 1291.000 |
| 7 | 1184.000 |
| 8 | 1086.000 |
| 9 | 995.600 |
| 10 | 913.000 |
| 11 | 837.200 |
| 12 | 767.700 |
| 13 | 704.000 |
| 14 | 645.600 |
| 15 | 592.000 |
| 16 | 542.900 |
| 17 | 497.800 |
| 18 | 456.500 |
| 19 | 418.600 |
| 20 | 383.900 |
| 21 | 352.000 |
| 22 | 322.800 |
| 23 | 296.000 |
| 24 | 271.400 |
| 25 | 248.900 |
| 26 | 228.200 |

TABLE 1-continued

| Channel | Particle size (μm) |
|---|---|
| 27 | 209.300 |
| 28 | 191.900 |
| 29 | 176.000 |
| 30 | 161.400 |
| 31 | 148.000 |
| 32 | 135.700 |
| 33 | 124.500 |
| 34 | 114.100 |
| 35 | 104.700 |
| 36 | 95.960 |
| 37 | 88.000 |
| 38 | 80.700 |
| 39 | 74.000 |
| 40 | 67.860 |
| 41 | 62.230 |
| 42 | 57.060 |
| 43 | 52.330 |
| 44 | 47.980 |
| 45 | 44.000 |
| 46 | 40.350 |
| 47 | 37.000 |
| 48 | 33.930 |
| 49 | 31.110 |
| 50 | 28.530 |
| 51 | 26.160 |
| 52 | 23.990 |
| 53 | 22.000 |
| 54 | 20.170 |
| 55 | 18.500 |
| 56 | 16.960 |
| 57 | 15.560 |
| 58 | 14.270 |
| 59 | 13.080 |
| 60 | 12.000 |
| 61 | 11.000 |
| 62 | 10.090 |
| 63 | 9.250 |
| 64 | 8.482 |
| 65 | 7.778 |
| 66 | 7.133 |
| 67 | 6.541 |
| 68 | 5.998 |
| 69 | 5.500 |
| 70 | 5.044 |
| 71 | 4.625 |
| 72 | 4.241 |
| 73 | 3.889 |
| 74 | 3.566 |
| 75 | 3.270 |
| 76 | 2.999 |
| 77 | 2.750 |
| 78 | 2.522 |
| 79 | 2.312 |
| 80 | 2.121 |
| 81 | 1.945 |
| 82 | 1.783 |
| 83 | 1.635 |
| 84 | 1.499 |
| 85 | 1.375 |
| 86 | 1.261 |
| 87 | 1.156 |
| 88 | 1.060 |
| 89 | 0.972 |
| 90 | 0.892 |
| 91 | 0.818 |
| 92 | 0.750 |
| 93 | 0.688 |
| 94 | 0.630 |
| 95 | 0.578 |
| 96 | 0.530 |
| 97 | 0.486 |
| 98 | 0.446 |
| 99 | 0.409 |
| 100 | 0.375 |
| 101 | 0.344 |
| 102 | 0.315 |
| 103 | 0.289 |
| 104 | 0.265 |
| 105 | 0.243 |
| 106 | 0.223 |
| 107 | 0.204 |
| 108 | 0.187 |
| 109 | 0.172 |
| 110 | 0.158 |
| 111 | 0.145 |
| 112 | 0.133 |
| 113 | 0.122 |
| 114 | 0.111 |
| 115 | 0.102 |
| 116 | 0.094 |
| 117 | 0.086 |
| 118 | 0.079 |
| 119 | 0.072 |
| 120 | 0.066 |
| 121 | 0.061 |
| 122 | 0.056 |
| 123 | 0.051 |
| 124 | 0.047 |
| 125 | 0.043 |
| 126 | 0.039 |
| 127 | 0.036 |
| 128 | 0.033 |
| 129 | 0.030 |
| 130 | 0.028 |
| 131 | 0.026 |
| 132 | 0.023 |

The powdery food of one or more embodiments of the present invention can be manufactured by subjecting a dried sucrose-containing plant having a predetermined sucrose content or more and a predetermined dietary fiber content or more to crushing such that the particle size d50 after ultrasonication is a predetermined value or less and allowing the powdery food to have a predetermined content of acetoin and/or a predetermined content of dimethyl sulfoxide. Details are as described above. For incorporating acetoin and/or dimethyl sulfoxide, acetoin and/or dimethyl sulfoxide in a pure form or a composition containing acetoin and/or dimethyl sulfoxide may be added to or mixed with a powder of a plant before drying, or added to or mixed with a dried plant after drying and before crushing, followed by crushing, or added to or mixed with a powdery food. The composition containing acetoin and/or dimethyl sulfoxide may be a foodstuff and may be derived from a plant.

One or more embodiments of the present invention also include a method for suppressing the burnt odor derived from sucrose of a powdery food and enhancing the sweet flavor derived from sucrose, the method including adding a predetermined amount of acetoin and/or a predetermined amount of dimethyl sulfoxide to a powdery food derived from a sucrose-containing plant having a predetermined sucrose content or more and a predetermined dietary fiber content or more and a predetermined value or less of a particle size d50 after ultrasonication (e.g., dried and crushed product of a sucrose-containing plant). Details are as described above. As described above, the burnt odor derived from sucrose is suppressed and the characteristic sweet flavor of sucrose inherent in a plant is further enhanced by incorporating acetoin and/or dimethyl sulfoxide in certain ranges of their respective contents to a powdery food having a predetermined sucrose content or more and a predetermined dietary fiber content or more and a predetermined value or less of a particle size d50 after ultrasonication.

One or more embodiments of the present invention also encompass a food/drink containing the powdery food of one or more embodiments of the present invention. Specifically, in a food/drink containing a powdery food derived from a sucrose-containing plant, the burnt odor derived from sucrose can be suppressed, and the pleasant flavor of a sucrose-containing plant having enhanced sweet flavor derived from sucrose can be imparted to the food/drink, whereby the flavor of the food/drink can be improved by the effects of the powdery food of one or more embodiments of the present invention. The amount of the powdery food of one or more embodiments of the present invention contained in the food/drink is not particularly limited and may be appropriately adjusted such that the improved flavor of the sucrose-containing plant can be given to the food/drink. The proportion of the sucrose-containing plant with respect to the total amount of the food/drink may be 10 mass % or more, 20 mass % or more, 30 mass % or more, or 40 mass or more. The upper limit may be 100 mass % or less.

The powdery food of one or more embodiments of the present invention may contain another foodstuff as long as it does not interfere with the function and effect of one or more embodiments of the present invention. Specifically, such a foodstuff is a foodstuff or ingredient larger than 2,000 μm (2 mm), which is not the target of laser diffraction particle size distribution measurement. Examples thereof include grain puffs, dried nuts, and dried fruits, and any thereof may be used. These foodstuffs may be used alone or in an arbitrary combination of two or more thereof.

In such a case, the 50% integrated diameter after ultrasonication is measured after removing, from the ingredients, those having a diameter of the measurement upper limit, 2,000.00 μm or more.

Examples of the food/drink containing the powdery food of one or more embodiments of the present invention include, but not limited to, liquid foods such as beverages (e.g., soup and smoothie), liquid, semi-solid, or solid food/drink such as seasonings (e.g., mayonnaise, dressing, butter, and margarine), semi-solid or solid foods such as confectioneries (e.g., granola, sticks, crackers, caramel, gummies, and chips), and powdery foods such as dry seasonings.

Accordingly, one or more embodiments of the present invention also encompass a method for manufacturing a food/drink containing a powdery food containing a sucrose-containing plant and having a particle size d50 after ultrasonication of 1,000 μm or less, the method comprising crushing a sucrose-containing plant having a sucrose content of 2.5 mass % or more in terms of dry mass and a dietary fiber content of 1 mass % or more in terms of dry mass and allowing the powdery food to contain 1 ppb or more and 40,000 ppb or less of acetoin. One or more embodiments of the present invention also encompass a method for manufacturing a food/drink containing a powdery food containing a sucrose-containing plant containing 1 ppb or more and 40,000 ppb or less of dimethyl sulfoxide in addition to acetoin. In the above manufacturing method, acetoin and/or dimethyl sulfoxide can be added at an arbitrary timing during the process of manufacturing a food/drink. Details are as described above. One or more embodiments of the present invention can be used for bringing out sweet flavor also in a powdery food containing a sucrose-containing plant that has not been heated and therefore does not need to control burnt odor; however, since one or more embodiments of the present invention exhibit effects of easily controlling the burnt odor derived from sucrose in a food/drink containing a powdery food containing a sucrose-containing plant and bringing out sweet flavor characteristic to sucrose, one or more embodiments of the present invention can be more suitably used in a food/drink containing a heat-treated powdery food containing a sucrose-containing plant (e.g., dry fine particles).

One or more embodiments of the present invention also encompass a method for enhancing the sweet flavor of a powdery food containing a sucrose-containing plant and having a particle size d50 after ultrasonication of 1,000 μm or less or a food/drink containing the powdery food, the method including crushing a sucrose-containing plant having a sucrose content of 2.5 mass % or more in terms of dry mass and a dietary fiber content of 1 mass % or more in terms of dry mass and allowing the powdery food to contain 1 ppb or more and 40,000 ppb or less of acetoin. One or more embodiments of the present invention further encompass a method for enhancing the sweet flavor of a powdery food containing a sucrose-containing plant containing 1 ppb or more and 40,000 ppb or less of dimethyl sulfoxide in addition to acetoin or a food/drink containing the powdery food. In the above-described methods, acetoin and/or dimethyl sulfoxide can be added to a food/drink at an arbitrary timing. Details are as described above. One or more embodiments of the present invention can be used for bringing out sweet flavor also in a powdery food containing a sucrose-containing plant that has not been heated and does not need controlling the burnt odor; since one or more embodiments of the present invention exhibit effects of easily controlling the burnt odor derived from sucrose in a food/drink containing a sucrose-containing plant and bringing out sweet flavor characteristic to sucrose, one or more embodiments of the present invention can be more suitably used in a food/drink containing a heat-treated powdery food containing a sucrose-containing plant (e.g., dry fine particles).

EXAMPLES

One or more embodiments of the present invention will now be described in more detail with reference to Examples, but these Examples are illustrative only for convenience of description, and one or more embodiments of the present invention are not limited to these Examples in any sense. Water used was all distilled water unless otherwise specified.

As shown in Tables 2 and 3, powders in a dry state (moisture content: 10% or less) of beet, corn, carrot, pumpkin, soybean, sweet potato, pineapple, banana, mango, and almond were selected as sucrose-containing plants. Acetoin in pure form (manufactured by Tokyo Chemical Industry Co., Ltd.) and/or dimethyl sulfoxide in pure form (manufactured by FUJIFILM Wako Pure Chemical Corporation) was diluted with water to an appropriate concentration and was added to and mixed with the powders, and the resultant was adjusted to have a certain content thereof (1 mL of water (control) or a dilution of acetoin and/or dimethyl sulfoxide adjusted to an appropriate concentration was added to 10 g of a powdery food derived from a sucrose-containing plant, followed by well mixing. The concentration of acetoin and/or dimethyl sulfoxide was adjusted in terms of the content with respect to the powdery food). The particle size d50 after ultrasonication, sucrose content, and dietary fiber content were measured under the above-mentioned suitable conditions. Subsequently, these powdery foods were subjected to sensory inspection for the effect of reducing the burnt odor derived from sucrose, the effect of enhancing the sweet flavor derived from sucrose, and comprehensive evaluation. Furthermore, powdery foods were produced by mixing with the sample of Test Example 18 and sodium chloride at the proportions shown in the table and were verified whether the effects of one or more embodiments of the present invention were exhibited or not.

The pastes of Comparative Example 4, and Test Examples 43 and 44 were obtained by mixing 50 mass % of a powdery food of a sucrose-containing plant, beet, with canola oil and micronizing the mixtures using "RMB easynano" (product name) manufactured by Aimex Co., Ltd. The micronization was performed by using 380 g of zirconia beads of a diameter of 2 mm for 120 mL of the mixture of a powdery food of beet and canola oil under conditions of a mill rotation speed of 2,000 rpm and a cooling water temperature of 5° C. for 30 minutes. The concentration of acetoin and/or dimethyl sulfoxide in the powdery food of beet was previously adjusted according to the above-described method.

Beverages of Comparative Example 5, and Test Examples 45 to 48 were prepared by mixing 10 mass % of a powdery food of beet with water, filling a 180-mL glass bottle with 150 mL of this mixture, sterilizing the bottle in a hot water bath (temperature reached: 60° C.), cooling, and performing capping. The concentration of acetoin and/or dimethyl sulfoxide in the powdery food of beet was previously adjusted according to the above-described method.

The particle size d50 of each of the powdery foods after ultrasonication, the particles in the pastes, and the particles in the beverages, sucrose content, and dietary fiber content were measured under the above-mentioned suitable conditions. Subsequently, these powdery foods were subjected to sensory inspection for the effect of reducing the burnt odor derived from sucrose, the effect of enhancing the sweet flavor derived from sucrose, and comprehensive evaluation. Furthermore, powdery foods were produced by mixing with the sample of Test Example 18 and sodium chloride at the proportions shown in the table and were verified whether the effects of one or more embodiments of the present invention were exhibited or not.

The evaluation criteria are as follows.

<Evaluation Criterion No. 1: Burnt Odor Derived from Sucrose>
 5: Excellent because burnt odor derived from sucrose is not sensed at all;
 4: Somewhat excellent because almost no burnt odor derived from sucrose is sensed;
 3: Burnt odor derived from sucrose is sensed but is at an acceptable level;
 2: Somewhat inferior because burnt odor derived from sucrose is somewhat strongly sensed; and
 1: Inferior because burnt odor derived from sucrose is strongly sensed.

Here, burnt odor derived from sucrose was evaluated in terms of unpleasant offensive odor that fresh edible plants do not inherently have, such as burnt odor caused by drying treatment.

<Evaluation Criterion No. 2: Sweet Flavor Derived from Sucrose>
 5: Excellent because sweet flavor derived from sucrose is strongly sensed;
 4: Somewhat excellent because sweet flavor derived from sucrose is slightly strongly sensed;
 3: Acceptable because sweet flavor derived from sucrose is sensed;
 2: Somewhat inferior because sweet flavor derived from sucrose is hardly sensed; and
 1: Inferior because sweet flavor derived from sucrose is not sensed.

Here, sweet flavor derived from sucrose was evaluated in terms of a sweet taste or a sweet aroma reminding it that fresh edible plants inherently have or obviously produce when cooked.

<Evaluation Criterion No. 3: Comprehensive Evaluation>
 5: Excellent because original natural flavor of sucrose-containing plant is strong;
 4: Somewhat excellent because original natural flavor of sucrose-containing plant is slightly strong;
 3: Acceptable because original natural flavor of sucrose-containing plant is sensed;
 2: Somewhat inferior because original natural flavor of sucrose-containing plant is somewhat weak; and
 1: Inferior because original natural flavor of sucrose-containing plant is weak.

The sensory inspectors were chosen from inspectors who were trained for the following discrimination tests A) to C) and showed particularly excellent results, had experience in product development and a wealth of knowledge about the quality of foods, such as taste and texture, and were capable of performing absolute evaluation on each sensory inspection item.

A) Taste quality discrimination test of correctly discriminating samples for five tastes (sweetness: taste of sugar, sourness: taste of tartaric acid, savoriness: taste of sodium glutamate, saltiness: taste of sodium chloride, and bitterness: taste of caffeine) from aqueous solutions produced so as to have a concentration close to the threshold of each component and two samples of distilled water, seven samples in total;
 B) Concentration difference discrimination test of correctly discriminating concentration differences in five sodium chloride aqueous solutions and five acetic acid aqueous solutions having concentrations slightly different from each other; and
 C) Triangle discrimination test of correctly discriminating a soy sauce of maker B from two soy sauces of maker A and the soy sauce of maker B, three samples in total.

In each of the evaluation items, all the inspectors evaluated standard samples in advance, and each score of the evaluation criteria was standardized. The sensory inspection was then performed with objectivity by 10 inspectors. The evaluation of the each item was made by selecting a rating closest to the inspector's own evaluation in five-grade scale of each item. The total result of the evaluation was calculated from the arithmetic mean values of the scores by 10 inspectors.

The results are shown in Tables 2 and 3.

TABLE 2

| | Sucrose-containing plant | Proportion of sucrose-containing plant mass % | Form of food/drink | Particle size after ultrasonication d50 (μm) | Sucrose content (g/100 g) | Dietary fiber content (g/100 g) | Acetoin (ppb) | Dimethyl sulfoxide (ppb) | Sensory inspection Burnt odor | Sweet aroma | Comprehensive evaluation |
|---|---|---|---|---|---|---|---|---|---|---|---|
| Comparative Example 1 | Beet | 100 | Powder | 1120.20 | 27.2 | 10.8 | 100 | ND (<1) | 1 | 1 | 1 |
| Comparative Example 2 | Beet | 100 | Powder | 80.92 | 27.2 | 10.8 | ND (<1) | ND (<1) | 1 | 1 | 1 |
| Test Example 1 | | | | | | | 1 | ND (<1) | 4 | 4 | 4 |
| Test Example 2 | | | | | | | 5 | ND (<1) | 5 | 4 | 4 |

TABLE 2-continued

| | Sucrose-containing plant | Proportion of sucrose-containing plant mass % | Form of food/drink | Particle size after ultrasonication d50 (μm) | Sucrose content (g/100 g) | Dietary fiber content (g/100 g) | Acetoin (ppb) | Dimethyl sulfoxide (ppb) | Burnt odor | Sweet aroma | Comprehensive evaluation |
|---|---|---|---|---|---|---|---|---|---|---|---|
| Test Example 3 | | | | | | | 10 | ND (<1) | 5 | 4 | 4 |
| Test Example 4 | | | | | | | 100 | ND (<1) | 5 | 4 | 4 |
| Test Example 5 | | | | | | | 300 | ND (<1) | 5 | 4 | 4 |
| Test Example 6 | | | | | | | 1000 | ND (<1) | 5 | 4 | 4 |
| Test Example 7 | | | | | | | 3000 | ND (<1) | 5 | 4 | 4 |
| Test Example 8 | | | | | | | 5000 | ND (<1) | 5 | 4 | 4 |
| Test Example 9 | | | | | | | 10000 | ND (<1) | 5 | 4 | 4 |
| Test Example 10 | | | | | | | 20000 | ND (<1) | 5 | 4 | 4 |
| Test Example 11 | | | | | | | 30000 | ND (<1) | 5 | 4 | 4 |
| Test Example 12 | | | | | | | 40000 | ND (<1) | 5 | 4 | 4 |
| Test Example 13 | | | | | | | 1 | 40000 | 4 | 5 | 4 |
| Test Example 14 | | | | | | | 5 | 20000 | 5 | 5 | 5 |
| Test Example 15 | | | | | | | 10 | 30000 | 5 | 5 | 5 |
| Test Example 16 | | | | | | | 100 | 20000 | 5 | 5 | 5 |
| Test Example 17 | | | | | | | 300 | 10000 | 5 | 5 | 5 |
| Test Example 18 | | | | | | | 1000 | 5000 | 5 | 5 | 5 |
| Test Example 19 | | | | | | | 3000 | 1000 | 5 | 5 | 5 |
| Test Example 20 | | | | | | | 5000 | 300 | 5 | 5 | 5 |
| Test Example 21 | | | | | | | 10000 | 100 | 5 | 5 | 5 |
| Test Example 22 | | | | | | | 20000 | 10 | 5 | 5 | 5 |
| Test Example 23 | | | | | | | 30000 | 5 | 5 | 5 | 5 |
| Test Example 24 | | | | | | | 40000 | 1 | 5 | 4 | 4 |
| Comparative Example 3 | Corn | 100 | Powder | 1210.45 | 10.00 | 8.3 | 100 | 100 | 2 | 3 | 2 |
| Test Example 25 | Corn | 100 | Powder | 20.50 | 10.00 | 8.8 | 1000 | ND (<1) | 5 | 4 | 4 |
| Test Example 26 | | | | | | | 1000 | 5 | 5 | 5 | 5 |
| Test Example 27 | Carrot | 100 | Powder | 61.12 | 11.5 | 10.0 | 600 | ND (<1) | 5 | 4 | 4 |
| Test Example 28 | | | | | | | 600 | 50 | 5 | 5 | 5 |
| Test Example 29 | Pumpkin | 100 | Powder | 101.54 | 8.2 | 7.7 | 400 | ND (<1) | 5 | 4 | 4 |
| Test Example 30 | | | | | | | 400 | 200 | 5 | 5 | 5 |
| Test Example 31 | Soybean | 100 | Powder | 415.56 | 7.2 | 14.6 | 200 | ND (<1) | 5 | 4 | 4 |
| Test Example 32 | | | | | | | 200 | 400 | 5 | 5 | 5 |
| Test Example 33 | Sweet potato | 100 | Powder | 721.43 | 7.3 | 5.1 | 50 | ND (<1) | 5 | 4 | 4 |
| Test Example 34 | | | | | | | 50 | 600 | 5 | 5 | 5 |
| Test Example 35 | Pineapple | 100 | Powder | 569.20 | 51.8 | 6.1 | 5 | ND (<1) | 5 | 4 | 4 |
| Test Example 36 | | | | | | | 5 | 1000 | 5 | 5 | 5 |
| Test Example 37 | Banana | 100 | Powder | 29.61 | 31.5 | 2.6 | 3 | ND (<1) | 5 | 4 | 4 |
| Test Example 38 | | | | | | | 3 | 2000 | 5 | 5 | 5 |
| Test Example 39 | Mango | 100 | Powder | 252.41 | 63.5 | 1.5 | 2 | ND (<1) | 5 | 4 | 4 |
| Test Example 40 | | | | | | | 2 | 3000 | 5 | 5 | 5 |
| Test Example 41 | Almond | 100 | Powder | 367.12 | 5.1 | 9.3 | 1 | ND (<1) | 4 | 4 | 4 |
| Test Example 42 | | | | | | | 1 | 3000 | 4 | 5 | 5 |
| Comparative Example 4 | Beet | 50 | Paste | 28.56 | 3.1 | 1 | ND (<1) | ND (<1) | 1 | 2 | 2 |
| Test Example 43 | | | | | | | 2 | ND (<1) | 5 | 4 | 4 |
| Test Example 44 | | | | | | | 2 | 3000 | 5 | 5 | 5 |
| Comparative Example 5 | Beet | 10 | Beverage | 253.46 | 6.1 | 2 | ND (<1) | ND (<1) | 2 | 2 | 2 |
| Test Example 45 | | | | | | | 1 | ND (<1) | 4 | 4 | 4 |
| Test Example 46 | | | | | | | 1 | 3000 | 4 | 5 | 5 |
| Test Example 47 | | | | | | | 100 | 100 | 5 | 5 | 5 |
| Test Example 48 | | | | | | | 1000 | 1000 | 5 | 5 | 5 |

TABLE 3

| | Sucrose-containing plant | Form of food/drink | Proportion of sucrose-containing plant mass % | Burnt odor of sucrose | Sweet aroma | Comprehensive evaluation |
|---|---|---|---|---|---|---|
| Test Example 49 | Test Example 18 + sodium chloride | Dry powder | 90.0 | 5 | 5 | 5 |
| Test Example 50 | | | 80.0 | 5 | 5 | 5 |
| Test Example 51 | | | 70.0 | 5 | 5 | 5 |
| Test Example 52 | | | 60.0 | 5 | 5 | 5 |
| Test Example 53 | | | 50.0 | 5 | 5 | 5 |
| Test Example 54 | | | 40.0 | 5 | 5 | 5 |

TABLE 3-continued

| | Sucrose-containing plant | Form of food/drink | Proportion of sucrose-containing plant mass % | Sensory inspection | | |
|---|---|---|---|---|---|---|
| | | | | Burnt odor of sucrose | Sweet aroma | Comprehensive evaluation |
| Test Example 55 | | | 30.0 | 5 | 5 | 4 |
| Test Example 56 | | | 20.0 | 5 | 5 | 4 |
| Test Example 57 | | | 10.0 | 5 | 5 | 4 |

As a result, it was revealed that in various powdery foods, pastes, and beverages containing sucrose and dietary fibers at predetermined proportions or more, the burnt odor derived from sucrose is suppressed and the sweet flavor derived from sucrose is enhanced by adjusting the acetoin content and/or dimethyl sulfoxide content and the particle sizes d50 of the powdery foods after ultrasonication, the particles in the pastes, and the particles in the beverages within predetermined ranges. It was also demonstrated that it is more preferable to adjust both the acetoin and dimethyl sulfoxide contents within predetermined ranges because the effects of one or more embodiments of the present invention are more strongly shown. In addition, it was demonstrated that the content of the powder derived from a sucrose-containing plant with respect to the whole of the powdery food may be within a predetermined range.

Although the disclosure has been described with respect to only a limited number of embodiments, those skilled in the art, having benefit of this disclosure, will appreciate that various other embodiments may be devised without departing from the scope of the present disclosure. Accordingly, the scope of the disclosure should be limited only by the attached claims.

The invention claimed is:

1. A method for manufacturing a powdery food, the method comprising:
   forming the powdery food by:
   a first step of drying a sucrose-containing plant having a sucrose content of 2.5 mass % or more in terms of dry mass and a dietary fiber content of 1 mass % or more in terms of dry mass to a state in which a content of water is 20 mass % or less, and
   a second step of crushing the sucrose-containing plant,
   wherein acetoin and dimethyl sulfoxide are added in a pure form or a composition containing acetoin and dimethyl sulfoxide before or after the first step or the second step,
   wherein the powdery food has a particle size d50 1,000 μm or less and contains 1 ppb or more and 40,000 ppb or less of acetoin and 1 ppb or more and 40,000 ppb or less of dimethyl sulfoxide, and
   wherein the powdery food comprises the sucrose-containing plant consisting of one plant selected from the group consisting of pumpkins, beets, carrots, soybeans, sweet potatoes, pineapples, bananas, mangoes, and almonds.

2. The method according to claim 1, wherein the powdery food has a sucrose-containing plant content of 90 mass % or more.

3. The method according to claim 1, wherein the powdery food has a content of sucrose derived from the sucrose-containing plant of 50 mass % or more with respect to a total sucrose content of the powdery food.

4. The method according to claim 1, wherein the sucrose-containing plant consists of one plant selected from the group consisting of pumpkins, beets, carrots, pineapples, and mangoes.

5. The method according to claim 1, wherein the powdery food has a dimethyl sulfoxide content of 300 ppb or more and 40,000 ppb or less.

* * * * *